United States Patent [19]
Alth

[11] 3,793,737
[45] Feb. 26, 1974

[54] SELF-TIMED REACTION-MASS COMPASS

[76] Inventor: Max Alth, 6 Tamarack Rd., Port Chester, N.Y. 10573

[22] Filed: Oct. 9, 1970

[21] Appl. No.: 79,557

[52] U.S. Cl. .................................................. 33/300
[51] Int. Cl. .......................................... G01c 17/00
[58] Field of Search ........... 33/204 D; 310/114, 115

[56]  References Cited
UNITED STATES PATENTS

| | | | |
|---|---|---|---|
| 488,305 | 12/1892 | Bradley | 310/115 X |
| 2,370,000 | 2/1945 | Best | 33/222 R |
| 2,611,191 | 9/1952 | Noxon et al. | 33/204 Q X |
| 3,561,129 | 2/1971 | Johnston | 33/226 R |

FOREIGN PATENTS OR APPLICATIONS

| | | | |
|---|---|---|---|
| 288 | 7/1876 | Great Britain | 33/300 |
| 515,252 | 12/1930 | Germany | 33/204 D |
| 539,817 | 9/1941 | Great Britain | 33/204 GB |

*Primary Examiner*—Robert B. Hull

[57]  ABSTRACT

Two horizontal discs of identical mass and dimensions are rotated in opposite directions at identical and fixed speed. Each disc is pierced by a radial slot. Coincidence of said slots provides an index spot on a compass card. Said coincidence is independent of the device support and holds its direction in space despite support movement and rotation. The discs may be rotated by any means. A counter may be employed to read out the slot-coincidence position in degrees relative to any fixed angular position about the axis of said discs.

2 Claims, 10 Drawing Figures

PATENTED FEB 26 1974 3,793,737

INVENTOR.
Max Alth.

PATENTED FEB 26 1974 3,793,737
SHEET 2 OF 3
fig. 3
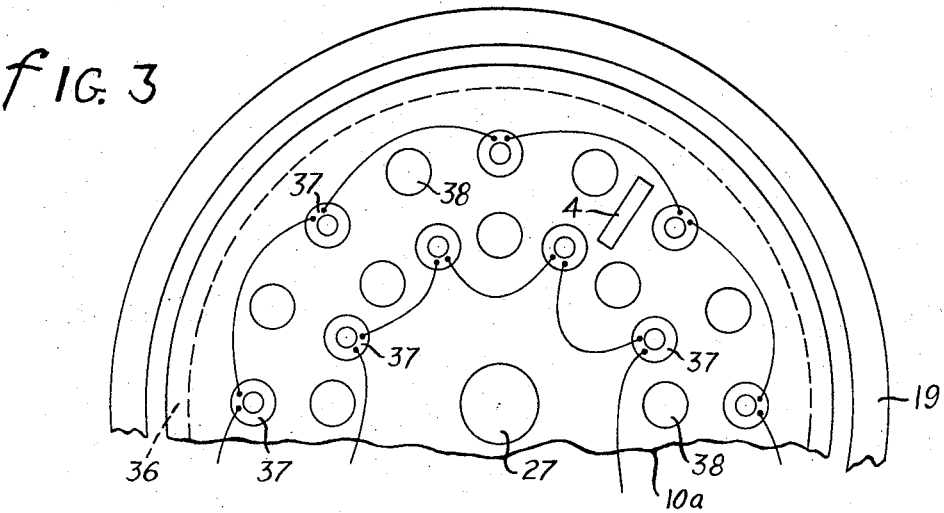
fig. 4a
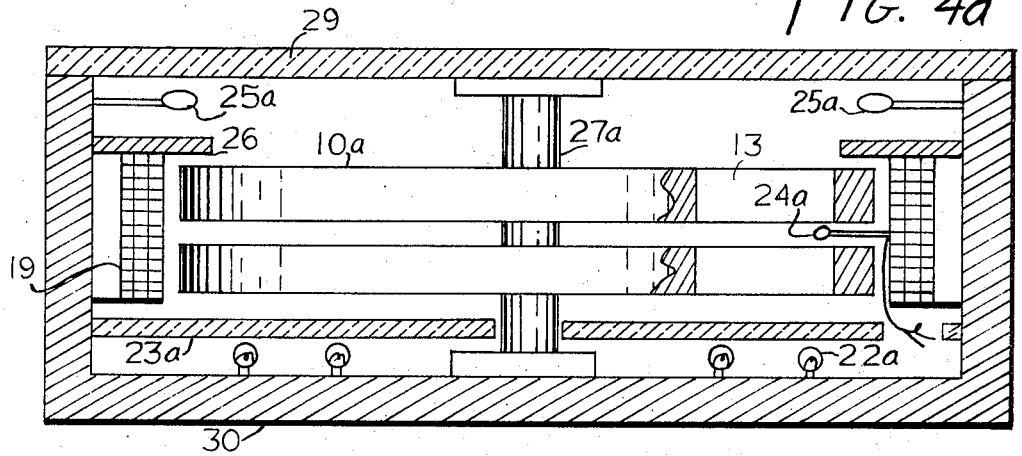
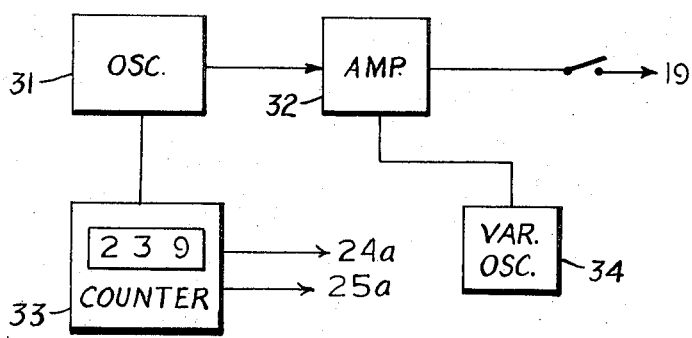
fig. 4b
INVENTOR.
Max Alth

PATENTED FEB 26 1974

INVENTOR.

SELF-TIMED REACTION-MASS COMPASS

The invention herewith disclosed provides a compass which is independent of the earth's magnetic poles, and which is considerably more accurate over a long period of time than the gyroscopic compass.

The present invention provides an improved basis for an inertial guidance system.

The present invention provides a compass which can easily be read by machine, i.e., electonic read-out and display at any desired distance from said device.

The present invention yields angular position in digital form.

FIG. 3 is a simplified plan view of the essential AC drive arrangement shown in FIG. 5, and utilized basically in FIG. 4.

FIGS. 4a and 4b show the present invention with associated electronic equipment for electronic read-out and display, plus direct visual position read-out.

PRINCIPLE OF OPERATION

Figure 1A:
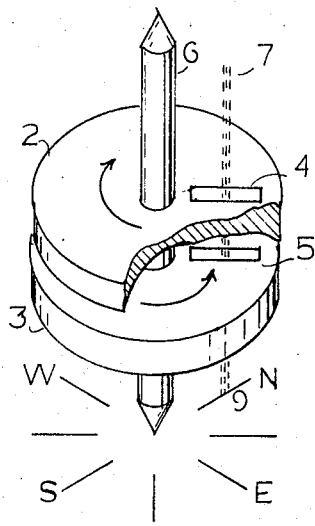
FIGS. 1a and 1b are simplied views of the essential elements of the present invention.
Figure 1B:
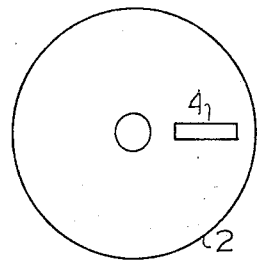

Referring to FIGS. 1a and 1b, 2 and 3 are discs rotating in opposite directions on shaft 6; 4 and 5 are radial slots that pass through said discs. 7 represents a line of sight, while 8 indicates what will be seen at the termination of said line of sight. In the plan view, FIG. 1b, 4 is a top view of the slot passing through disc 2.

The earth may be considered a time-mass compass. A sailor refers to his chromometer to relate the position of the sun to his longitude and a fixed point of time; namely Greenwich time.

To duplicate the earth as a compass, one would need to duplicate its mass. However, by using two masses rotating in opposite directions, high time-mass accuracy can be obtained. So long as the two discs rotate at a fixed frequency or speed, slot 4 ( FIG. 1a) and slot 5 will cross each other at equal intervals in time and therefore the slots will point in the same direction at that instant despite the turning of the compass card shown beneath the discs.

Figure 2:
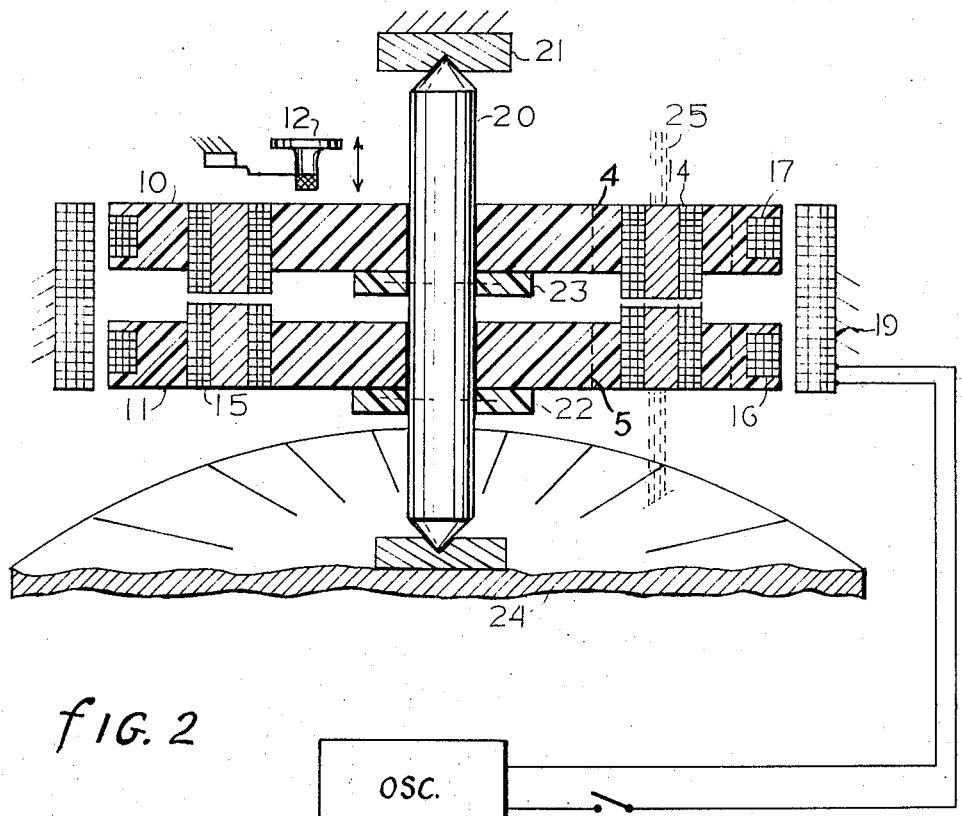
FIG. 2 shows a direct positional read-out arrangement.

In FIG. 2, one means for rotating the two discs at a fixed speed by means physically separated from said discs is illustrated. Other means are shown in figures following.

In FIG. 2, 10 and 11 are the discs, 20 is the shaft on which they rotate freely, 22 and 23 are supporting means. Power to the discs is imparted by a fixed solenoidal coil 19 powered by an oscillator. Each disc comprises one half of a synchronous motor. Coils 16 and 17 are solenoidal coils within the field of the driving coil 19. 16 and 17 are each connected to a ring of solenoids, two of which are marked 14 and 15. 4 and 5 indicate the slots passing through said discs, while 25 indicates the light beam. 24 is one support for shaft 20 and includes a fixed compass card, while 21 provides the other bearing for the same shaft, 20.

No ferrous material is used with coils 19, 16 or 17. This is done to minimize whatever "locking" action may be present between these coils. Coil 19 energizes coils 16 and 17 which then energize the solenoids, which are arranged with their axes evenly spaced about shaft 20 and parallel thereto. In FIG. 2, 12 is a small brake, used to retard one disc momentarily.

In operation the discs are brought to synchronous speed by external means. Either the brake 12 or the power is momentarily disconnected to retard one or both discs until the slot is over "North". From that moment on, as long as power continues, slot coincidence is independent of rotor support. A change in driving frequency does not alter this as both discs are equally affected.

FIG. 3 is a partial plan view illustrating an arrangement of solenoids alternating with permanent magnets. Another view of this arrangement, from the side, illustrating the relationship between the solenoids and magnets in the upper and lower discs may be seen in FIG. 5.

In FIG. 3, 19 is the driving coil connected to a source of alternating current. 36 is the circumferential coil mounted on rotor 10, which is connected to the solenoids indicated by 37. The permanent magnets are 38. The slot is 4 and the shaft is 27.

Figure 5:
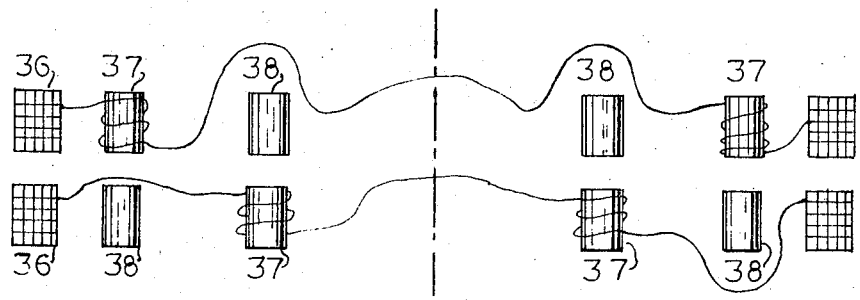
FIG. 5 shows the AC drive arrangement.

FIG. 4 a shows how the AC drive shown in FIGS. 3 and 5 may be utilized to rotate the two discs. Essentially there is the same basic arrangement of parts, some of which have been omitted for clarity. 27a is the shaft, 13 is the slot, 30 is the case, 29 is a translucent section of glass with compass points enscribed, 22a indicates a number of light bulbs constantly on, 23a is another piece of translucent glass; 24a and 25a are photoelectric cells and 26 is a light shield. 19 is the external coil connected to alternating current.

Case 30 in FIG. 4a may be evacuated to improve operation and reduce power requirements. For more efficient light reflection, translucent plate 26 may be partially silvered so that more of the light coming through the slots in coincidence is reflected onto the photo cell 25a.

Referring to FIG. 4a, assume for discussion a crystal controlled oscillator with a fixed frequency of 3,600 Hz driving the counter at the rate of one count per cycle. The counter starts when light strikes 24a and stops when light strikes 25a, displaying the last number when turned off.

Assume futher that we have rotors with 20 poles ( fewer poles are shown in FIG. 3 for simplicity).

Rotor speed in RPS – 2Hz/poles

The alternating current supplied the amplifier is reduced by a factor of ten; thus the rotor would revolve at 36 revolutions per second. As the counter is being driven at a rate of 360 counts per second; there is just enough time for the counter to go from zero to 360 every time the rotor makes one complete revolution. Thus, with the rotors at speed, the counter is started when light strikes 24a and stopped when light coming up through the coincident x slots strikes 25a.

In operation the variable oscillator is initiated at zero cycles and slowly brought up to 360 Hz, thus bringing the rotors to speed. The variable oscillator is disconnected and the rotors are switched to the fixed frequency oscillator. To bring the slots into coinciddnce over 0°, a brake not shown, but illustrated at 12 in FIG. 2 may be used.

Once coincidence is over 0°, the counter will read out whatever rotational change occurs to the supporting means.

It should be noted that in this arrangement the rotors are virtually isolated from their supporting and driving means; changes in base frequency affect both rotors and counter identically and thus are self eliminating. Rotor speed is synchronized with frequency and the opposite rotor. Slot coincidence is not locked to base frequency, but will shift with difference in the moment of inertia between the two rotors; slot coincidence will drift in the direction of the heavier rotor. Also, slot coincidence will eventually fall prey to cumulative frictional differences, i.e., slot coincidence will travel angularly in the direction of that disc with the greatest coefficient of friction.

Neither of these two considerations are insurmountable, as corrections can be made empirically. Long-term mass and frictional changes, however, do in theory appear to be the limiting factors in long term stability.

FIG. 5 shows how permanent magnets are alternated with solenoids to cut rotational speed in half. 36 is the circumferential coil on the rotor; 37 indicates solenoids and 38 indicates permanent magnets.

Figure 6:
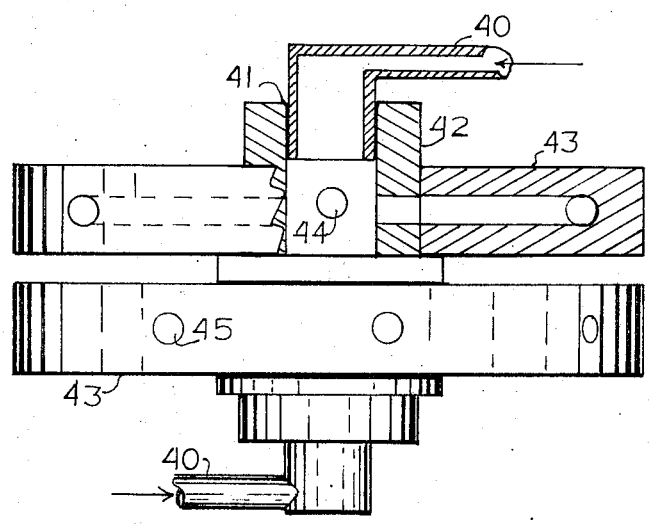
FIG. 6 shows how the discs may be air driven.
Figure 7A:
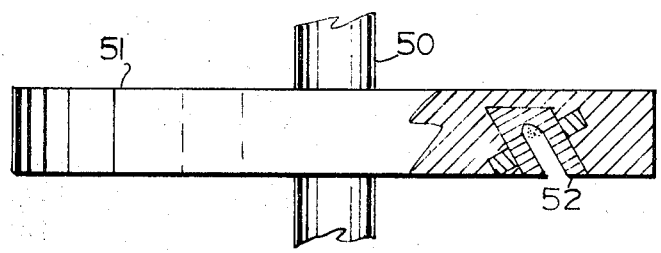
FIGS. 7a and 7b show how atomic energy may be used to drive the discs.
Figure 7B:
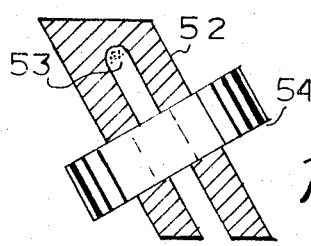

FIG. 6 illustrates how the rotors may be driven by compressed air. 40 indicates the two air inlets and supports, 41 is the slip joint, 42 the shaft, which rotates, 43 indicates the rotors, 44 is an air inlet hole in the rotor leading to the annulus and 45 is an exhaust hole.

FIG. 6 shows how the rotors may be driven by radioactive material. 50 is the shaft, 51 is one rotor, while 52 is the reactive atomic engine's lead shield. 53 is the radioactive material and 54 is a magnett. Certain radioactive material in the presence of a magnetic field selectively discharges electrons. Such a discharge could be used to power the rotors.

I claim:

1. A compass comprising two like discs, each pierced therethrough axially by a radial slot; a case within which said discs are positioned face to face; a compass card mounted on said case coaxially of said discs; a common central axis shaft for said discs positioned vertically in said case; each of said discs being freely rotatably mounted coaxially on said shaft and comprising a coaxial coil circumferentially thereon and a plurality of solenoids and permanent magnets in equal number mounted on said disc and distributed evenly and alternately about the disc axis with their magnetic axes parallel to said axis, and said solenoids being connected to said coil; source of alternating electric current; and a third coil fixed relative to said case coaxially with said shaft and of inner circumference slightly larger than said discs; said third coil being connected to said source and positioned with its alternating current field common to both said coils on said discs, so that when said discs are brought to synchronous speed, each spinning in a direction opposite to the other, alternating current energy is transferred from said third coil to the two said circumferential coils on said discs and they spin at synchronous speed in opposite directions.

2. A compass as claimed in claim 1, further comprising a steady source of light in fixed position relative to the case beneath the lower of said discs; a photo1cell in fixed position between the discs; a plurality of photocells in fixed position above the upper one of said discs; bands shielding said plurality of photo-cells from light other than that which may come up from below; and an electronic counter connected to said alternating current source; and said photo-cell between the discs and said plurality of photo-cells above the discs being suitably connected to said electronic counter so that said photo cell between the discs initiates counting and said plurality of photo cells stops the counting.

* * * * *